United States Patent
Chopping

Patent Number: 5,504,739
Date of Patent: Apr. 2, 1996

[54] RECONFIGURABLE SWITCH MEMORY

[75] Inventor: Geoffrey Chopping, Dorset, England

[73] Assignee: GPT Limited, United Kingdom

[21] Appl. No.: 309,562

[22] Filed: Sep. 20, 1994

Related U.S. Application Data

[63] Continuation of Ser. No. 21,056, Feb. 23, 1993, abandoned.

[30] Foreign Application Priority Data

Feb. 26, 1992 [GB] United Kingdom ............ 9204100

[51] Int. Cl.⁶ .................................... H04Q 11/04
[52] U.S. Cl. ........................... 370/58.1; 370/64
[58] Field of Search ............ 370/58.1, 60, 60.1, 370/64, 79, 84

[56] References Cited

U.S. PATENT DOCUMENTS 4,965,787 10/1990 Almond et al. ............ 370/58.1

FOREIGN PATENT DOCUMENTS 1349823 4/1974 United Kingdom .
1573807 8/1980 United Kingdom .
2254754 10/1992 United Kingdom .

*Primary Examiner*—Melvin Marcelo
*Attorney, Agent, or Firm*—Kirschstein et al.

[57] ABSTRACT

A reconfigurable switch memory which is applicable to time switches and space switches enables two very different time switching functions to be efficiently implemented by one type of switching unit. A reconfigurable switching device is provided which, for instance, can work in either one bit or five bit mode, the granularity of the switch being varied.

1 Claim, 15 Drawing Sheets

| INTERFACES STM-1 (64kb/s) | UNITS PER PLANE | AVAILABLE GRANULARITIES ||||||||
|---|---|---|---|---|---|---|---|---|---|
| | | VC 4 | VC 3 | VC 2 | VC 12 | VC 11 | NX64 kb/s | 64 kb/s | 32 kb/s |
| 4 (9k) | 1 CARD | ★ | ★ | ★ | ★ | ★ | ★ | ★ | ★ |
| 8 (19k) | 1 CARD | ★ | ★ | ★ | ★ | ★ | ★ | ★ | ★ |
| 16 (38k) | 2 CARDS | ★ | ★ | ★ | ★ | ★ | ★ | ★ | ★ |
| 32 (77k) | 1 UNIT | ★ | ★ | ★ | ★ | ★ | ★ | ★ | ★ |
| 64 (155k) | 2 UNITS | ★ | ★ | ★ | ★ | ★ | ★ | ★ | |
| 160 | 5 UNITS + B/SPREAD | ★ | ★ | ★ | ★ | ★ | | | |
| 320 | 10 UNITS + B/SPREAB | ★ | ★ | ★ | ★ | ★ | | | |

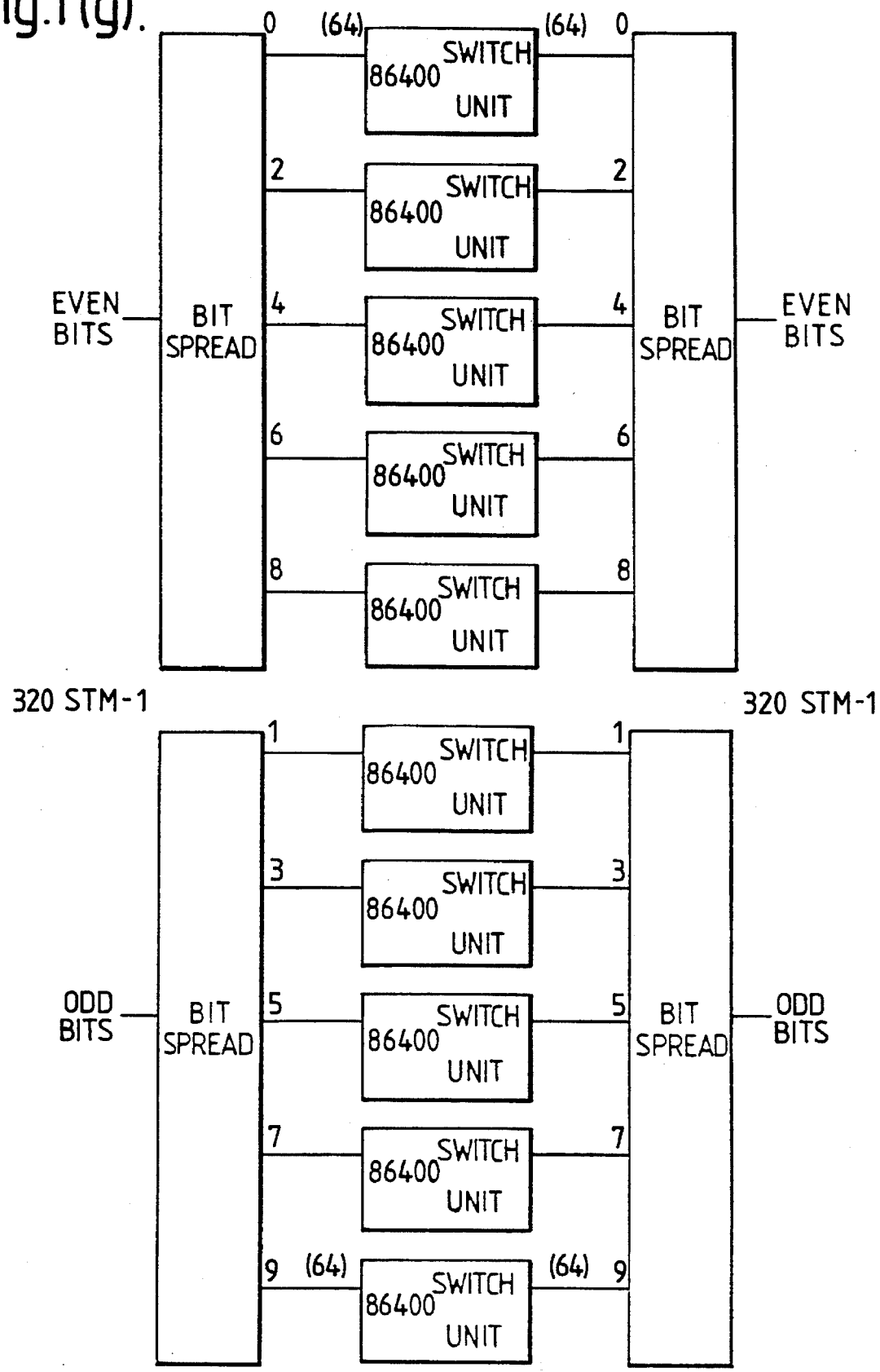

Fig.7.

| INTERFACES STM-1 (64kb/s) | UNITS PER PLANE | AVAILABLE GRANULARITIES ||||||||
|---|---|---|---|---|---|---|---|---|---|
| | | VC 4 | VC 3 | VC 2 | VC 12 | VC 11 | NX64 kb/s | 64 kb/s | 32 kb/s |
| 4 (9k) | 1 CARD | ★ | ★ | ★ | ★ | ★ | ★ | ★ | ★ |
| 8 (19k) | 1 CARD | ★ | ★ | ★ | ★ | ★ | ★ | ★ | ★ |
| 16 (38k) | 2 CARDS | ★ | ★ | ★ | ★ | ★ | ★ | ★ | ★ |
| 32 (77k) | 1 UNIT | ★ | ★ | ★ | ★ | ★ | ★ | ★ | |
| 64 (155k) | 2 UNITS | ★ | ★ | ★ | ★ | ★ | | ★ | |
| 160 | 5 UNITS + B/SPREAD | ★ | ★ | ★ | ★ | ★ | | | |
| 320 | 10 UNITS + B/SPREAD | ★ | | | | | | | |

RECONFIGURABLE SWITCH MEMORY

This is a continuation of application Ser. No. 08/021,056; filed Feb. 23, 1993, abandoned.

BACKGROUND OF THE INVENTION

1. Field of the Invention

The technique described is applicable to time switches and space switches. The time switching function will be the one described in more detail.

DESCRIPTION OF THE PRIOR ART

It enables two very different time switching functions to be efficiently implemented by one type of switching unit.

There are many designs of, for instance, 64 kbit/s time switches, normally having a common frame structure.

They normally have a speech store, to hold the data samples and a control store, to define which data sample is to be routed to a particular time slot on a particular output port.

The 64 kbit/s frame structure has timeslots of 8 bits. The Frame repetition rate is 125 microseconds.

Internal to the switch, it is not uncommon to carry some extra signalling or check bits and the switch may therefore carry perhaps 10 bits instead of 8 bits.

There are newer transmission formats which are still based on a Frame structure of 125 microseconds, but which are divided, in time, into 9 rows. Consequently the switch has to handle 9 timeslots per frame for each channel. It therefore has to handle a timeslot every ninth of a Frame. All the nine timeslots are routed to the same destination. It is therefore possible to use a time switching device which contains a data sample store and a control store which have only one ninth of the locations of a normal 64 kbit/s switch. This type of switch is often referred to as a Column switch.

A time switching device which has to operate on a fixed number of input and output ports of a fixed data rate, may be required to perform both 64 kbit/s switching and Column switching. When it is operating as a Column switch it is not using the memory efficiently.

It is known that in order to limit the amount of bandwidth carried by one time switching device, it is possible to have several switches in parallel where each device only handles one or some of the bits of a time slot. This technique is referred to as bit spreading.

This technique results in a copy of the control store being required in each of the parallel switching devices.

This technique also results in a larger number of channels being handled by the device and consequently a higher number of speech store accesses. This in turn can result in multiple copies of the speech stores because of the limited access times of the storage devices used.

Bit spreading makes the building of very large switches easier, but requires much more storage to do it.

So far only two features have been mentioned. Firstly, that a Column switch only needs one ninth of the memory of a directly equivalent 64 kbit/s switch and secondly, that bit spreading uses more memory.

It is possible to combine a 64 kbit/s switching function and a bit spreading column switching function, where the total storage requirements are within a factor of 2 of each other.

The 64 kbit/s function internally is a 10 bit times lot. This is split into two 5 bit half timeslots for the full size switch. The Column function is also based on 10 bit timeslots, which are carried as individual bits for the full size switch.

The full size Column switch has ten switch arrays each carrying one bit.

A half size Column switch has five switch arrays each carrying two bits.

A fifth size Column switch has two switch arrays each carrying five bits, which is the same arrangement as the full size 64 kbit/s switch.

A tenth size Column switch has one switch array each carrying 10 bits, which is the same arrangement as the half size 64 kbit/s switch.

This switching device is reconfigurable so that it can work in either one bit or 5 bit mode. This results in common high capacity 64 kbit/s and Column switching functions realised from a common time switching device.

Large switches are often made up of a combination of space switching and time switching devices. Space switching devices can also have their control stores reconfigured in the same manner.

SUMMARY OF THE INVENTION

According to the present invention there is provided a Synchronous Transfer Mode (STM) switching unit wherein the granularity of the switch may be varied.

BRIEF DESCRIPTION OF THE DRAWINGS

The present invention will now be described, by way of example, with reference to the accompanying drawings, in which:

FIGS. 1(a)–1(g) show examples of a range of STM-1 switches,

FIG. 7 shows a table of switch growth states.

DETAILED DESCRIPTION OF THE PREFERRED EMBODIMENTS

Figure 1A:
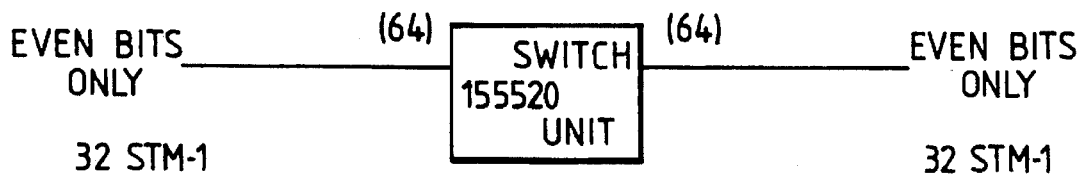

A good telecommunications switch needs more than just sound switching theory. It needs to meet its functional requirements and it also needs to be a soundly engineered product.

There are many switching theory techniques, a number of ways of functionally partitioning such techniques, and even more implementation methods.

A switch has to be able to transfer input circuits to output circuits, a multipurpose switch has to be able to handle more than one type of circuit.

There are two simple measures of switch capacity:

| | |
|---|---|
| interface bandwidth capacity; | which is the sum of the bandwidths of all the interfaces, |
| and circuit capacity; | which is the total number of |

| | | |
|---|---|---|
| | circuits the switch fabric can switch. | |

For a particular interface bandwidth capacity, as the granularity of the switch reduces the circuit capacity increases. As the circuit capacity increases the memory requirements of the switching elements increase as does the complexity of the control mechanisms.

Over a range of interface bandwidth capacities and a range of switching granularities the switching memory requirements and the complexity of the control can vary very considerably.

It is apparent that if the switching granularity could increase as the interface bandwidth increases then the circuit capacity would remain constant as would the control complexity.

The amount of memory used is not just a function of interface bandwidth capacity and the circuit capacity. It is also dependent on the basic switch architecture as well as being dependent on the cycle time of the Memory and whether bit spreading is used.

Depending on the architecture and partitioning chosen, switches of the same interface bandwidth capacity can have very different amounts of internal cabling. For example, if the CLOS fanout interconnect is implemented using a backplane rather than cables then, the total internal cables may be halved.

The growth mechanisms can also have dramatic effects on the amount of cabling, if they are not well though out.

Rather than adding cards to partially empty shelves, a simple way of offering growth is to use more switching units. Building them into arrays has multi-stage and cabling difficulties, but running them in parallel can be quite straight forward. The variable bit spreading method offers very convenient growth characteristics.

For a range of switches, from 32 STM-1 interfaces of 55.52 Mbit/s, up to 320 STM-1 interfaces, 4 configurations can be used.

1 Switch Unit for 32 STM-1 interfaces
2 Switch Units for 64 STM-1 interfaces
5 Switch Units for 160 STM-1 interfaces
10 Switch Units for 320 STM-1 interfaces FIG. 1 gives some examples

| 1(a) | 32 STM-1s | 1 Switch Unit | 155520 | channels of 32 kbit/s |
|---|---|---|---|---|
| 1(b) | 32 STM-1s | 1 Switch Unit | 77760 | channels of 64 kbit/s |
| 1(c) | 32 STM-1s | 1 Switch Unit | 8640 | columns for VC switching |
| 1(d) | 64 STM-1s | 2 Switch Units | 155520 | channels of 64 kbit/s |
| 1(e) | 64 STM-1s | 2 Switch Units | 17280 | columns for VC switching |
| 1(f) | 128 STM-1s | 5 Switch Units | 43200 | columns for VC switching |
| 1(g) | 320 STM-1s | 10 Switch Units | 86400 | columns for VC switching |

Bit Spreading units are only required for the two largest switches.

The same space-time-space switch unit is used for all the above 7 arrangements. It has to operate in 6 different modes to achieve the required switching granularity. The same mode is used for both the 1(a) and 1(d) arrangement.

FIG. 2(a) to 2(f) gives the 6 arrangements, of the Space-Time-Space switching structure that are used, It receives 64 cables of 116.64 Mbit/s carrying the odd or even bits of an STM-1, or individual bit numbers of 5 different STM-1s. Consequently a single switching unit can handle the equivalent of 32 STM-1s.

All the switching IC inputs and outputs run at a data rate of 19.44 Mbit/s, while the connections through the backplane are at 116.64 Mbit/s.

There are 3 timing options which affect the number and size of the channels handled by both the Time switch elements and the Space switch elements. There are also 2 size options for the space switches.

The time switch elements and time multiplexed space switch elements can operate with;

486 channels of 5 bits over a switching frame of 125 μs or 45 channels of 5 bits over a switching frame of 13.9 μs or 270 channels of 1 bit over a switching frame of 13.9 μs 13.9 μs is one ninth of 125 μs and corresponds to an SDH row, as described earlier.

Because the time switching element has 8 inputs and 8 outputs it handles 8 times these numbers of channels namely, 3888, 432 and 2160 channels for the above 3 arrangements.

The space switch elements supply the CLOS fanout and are either;

40×80 and 80×40 or dual 20×40 and 40×20

The FIG. 2(a) to 2(f) arrangement options are as follows;

| 2(a) | 40 × 80 | 3888 × 5 bits over 125 μs | 80 × 40 |
|---|---|---|---|
| 2(b) | dual 20 × 40 | 3888 × 5 bits over 125 μs | dual 40 × 20 |
| 2(c) | dual 20 × 40 | 432 × 5 bits over 13.9 μs | dual 40 × 20 |
| 2(d) | 40 × 80 | 432 × 5 bits over 13.9 μs | 80 × 40 |
| 2(e) | dual 20 × 40 | 2160 × 1 bit over 13.9 μs | dual 40 × 20 |
| 2(f) | 40 × 80 | 2160 × 1 bit over 13.9 μs | 80 × 40 |

In order to allow for growth over the range, arrangements 2(c), 2(d), 2(e), and 2(f) do not offer 64 kbit/s switching. Therefore path set ups are performed with a granularity of a column and a switching frame of a row, Whereas for arrangements 2(b) and 2(a), path set ups are performed with a granularity of 64 kbit/s. Arrangements 2(b) and 2(a) can perform VC switching, so 64 kbit/s and VC switching can be performed on the same switch, up to a maximum of 64 STM-1 or equivalent interfaces.

A Switching Unit contains a 3 stage Space-Time-Space function. There are 8 Outer Space Switching cards. Each Outer Space Switch card carries one first stage space switching element and one third stage space switching element. There are also 8 Central Time Switching cards. Each Central Time Switching card carries 10 second stage time switching elements.

Figure 3:
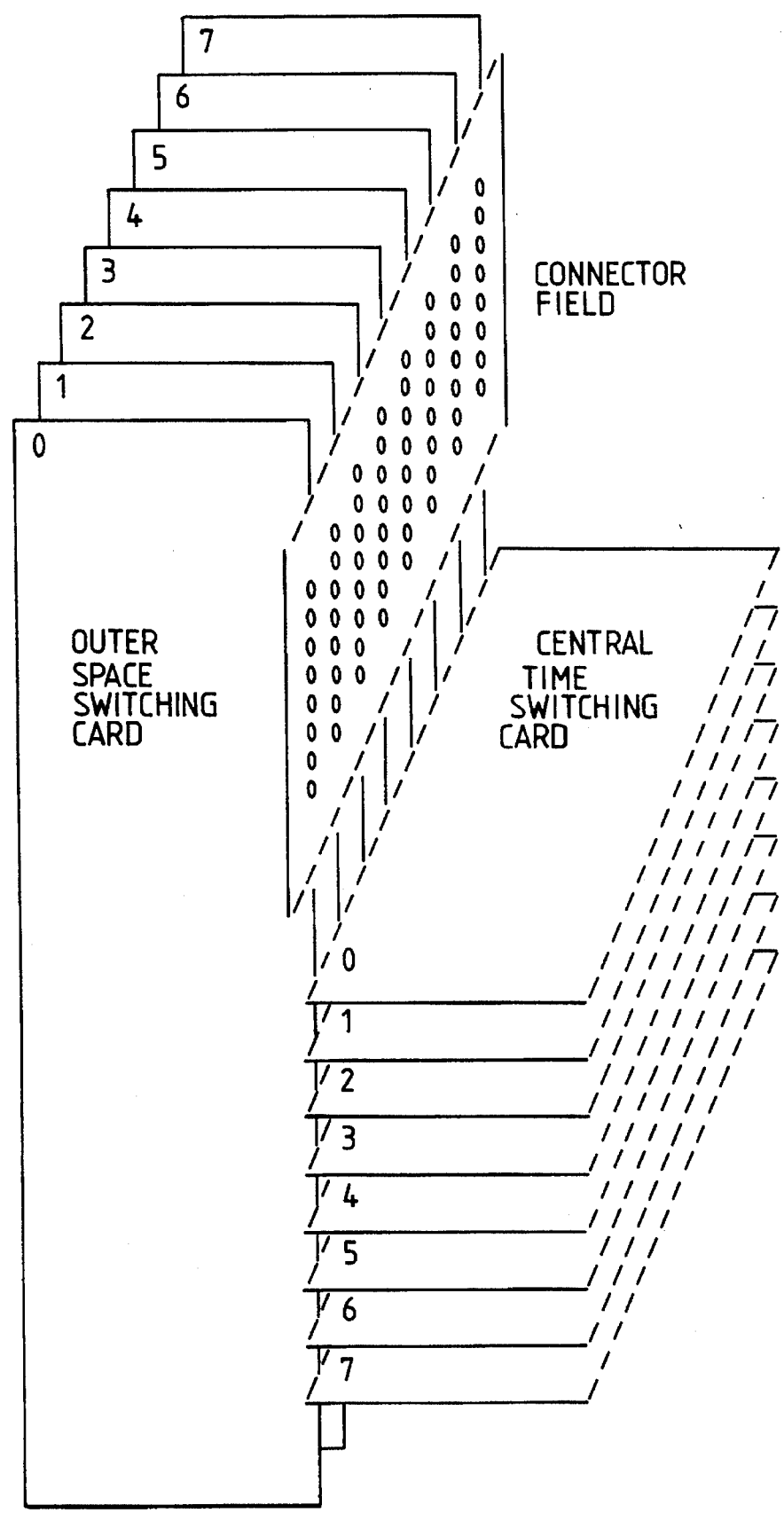
FIG. 3 shows a diagrammatic view of an orthogonal switching unit.

Because of the natural interconnection of a 3 stage switch, it is practicable to use an orthogonal structure, as shown in FIG. 3, which makes the handling of the bandwidth within the switching unit much easier. The vertical Outer Space Switching Card carries both the First and Third Space Switching Elements. This enables all the CLOS connections to pass directly from one switching stage to the next without the need for any high data rate backplane tracking. It also keeps all these high speed connections quite short.

Single Stage Switches make use of the same Time Switching Element. The space switch element is not used at all.

Only 5 of the similar 3 stage arrangements are listed below and shown in FIGS. 4(a), 4(b), 4(c), 4(d) and 4(e).

| 4(a) | 3888 channels | 1 Element | 3888 × 5 bits over 125 μs for 32 kbit/s |
|---|---|---|---|
| 4(b) | 1944 | 1 Element | 3888 × 5 bits over 125 μs for |

| | channels | | 64 kbit/s |
|---|---|---|---|
| 4(c) | 3888 channels | 2 Elements | 3888 × 5 bits over 125 µs for 64 kbit/s |
| 4(d) | 4 STM-1s | 5 Elements | 2160 × 1 bit over 13.9 µs for VCs |
| 4(e) | 8 STM-1s | 10 Elements | 2160 × 1 bit over 13.9 µs for VCs |

Figure 2A:
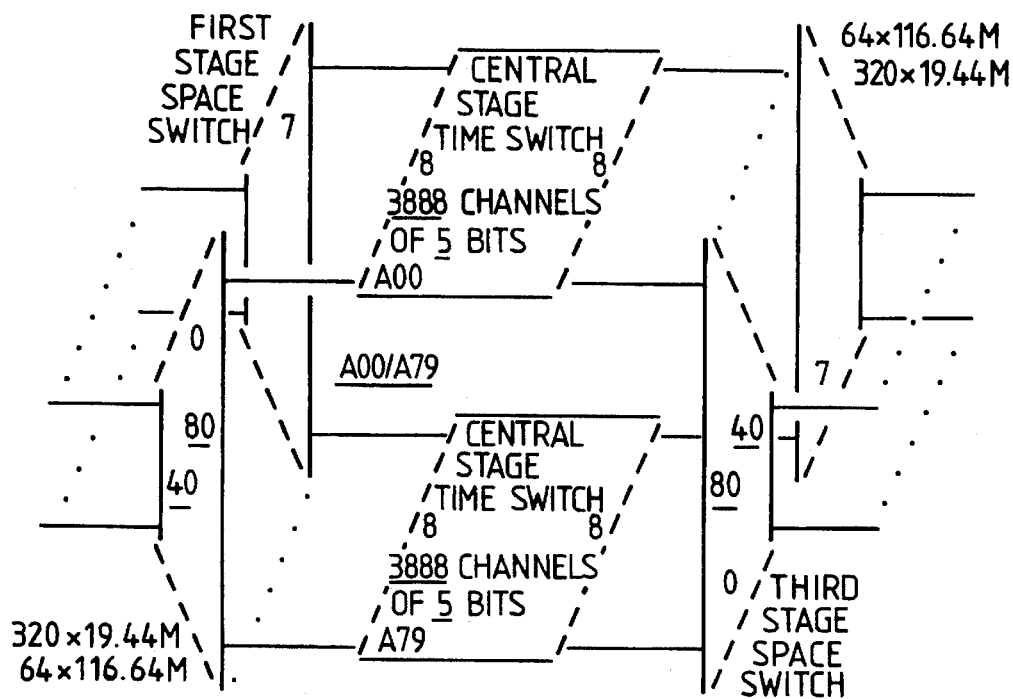
FIGS. 2(a)–2(f) show examples of switching unit structure.
Figure 2B:
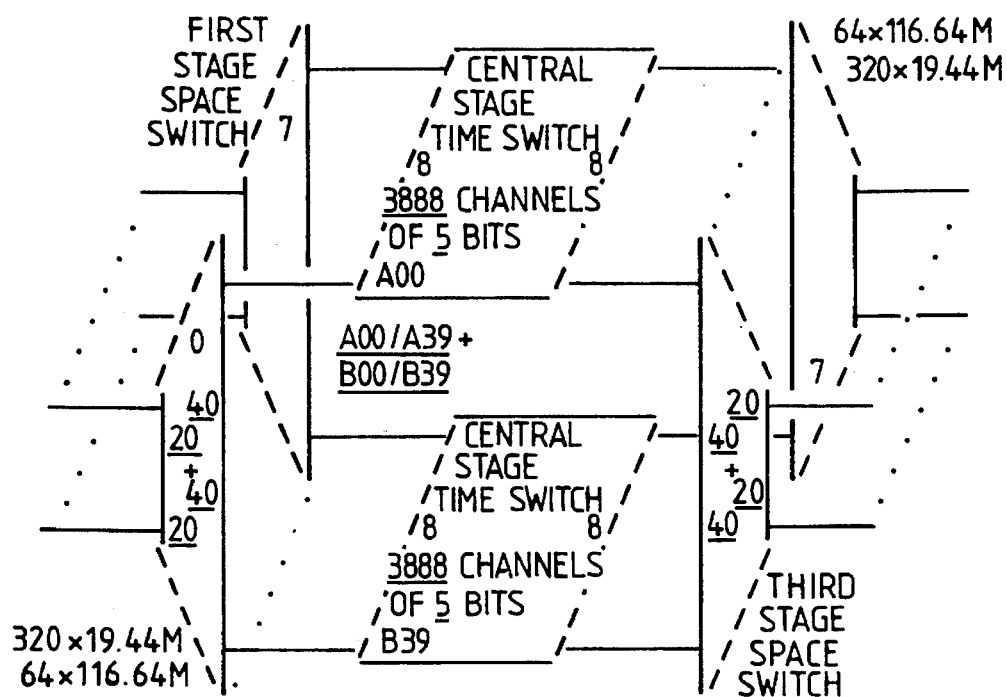
Figure 2C:
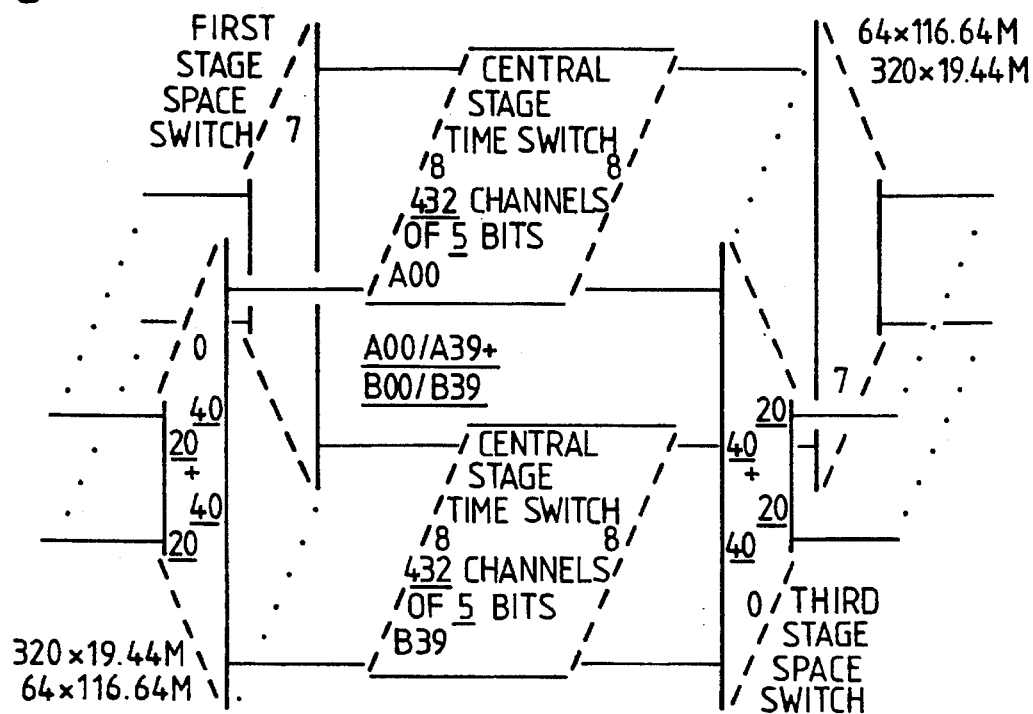
Figure 4A:
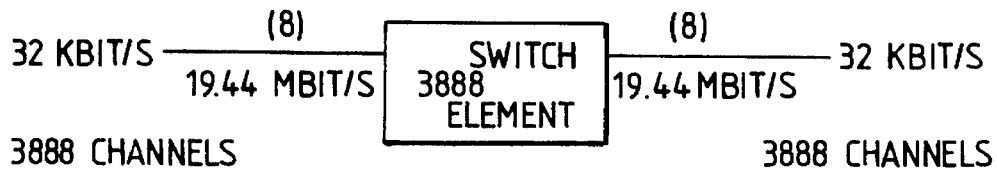
FIGS. 4(a)–4(e) show examples of single stage switch capacities.

The relationships between FIGS. 1(a) to 1(g), FIGS. 2(a) to 2(f) and FIGS. 4(a) to 4(e) are as follows:

FIG. 1(a) corresponds to FIG. 2(c) and corresponds to FIG. 4(a).

Figure 1B:
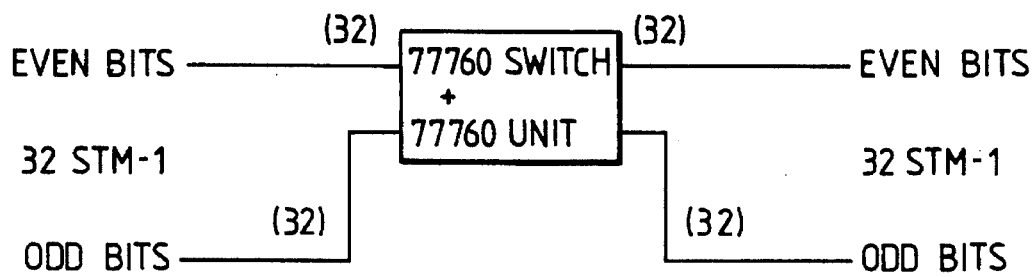
Figure 4B:
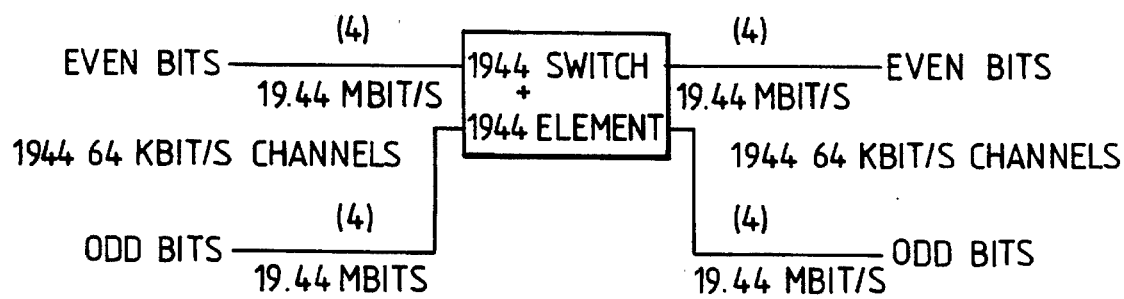

FIG. 1(b) corresponds to FIG. 2(b) and corresponds to FIG. 4(b).

Figure 1C:
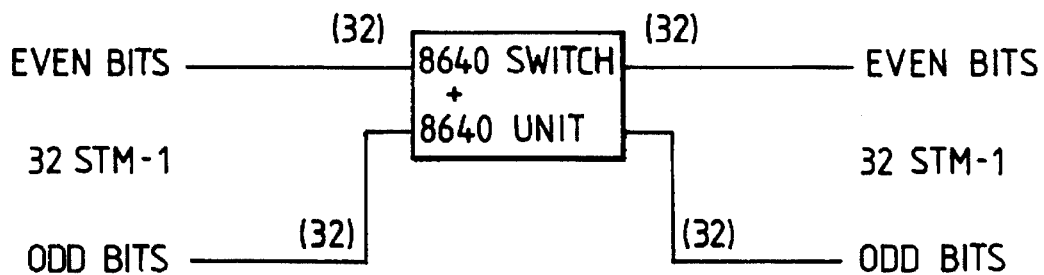

FIG. 1(c) corresponds to FIG. 2(c).

Figure 1D:
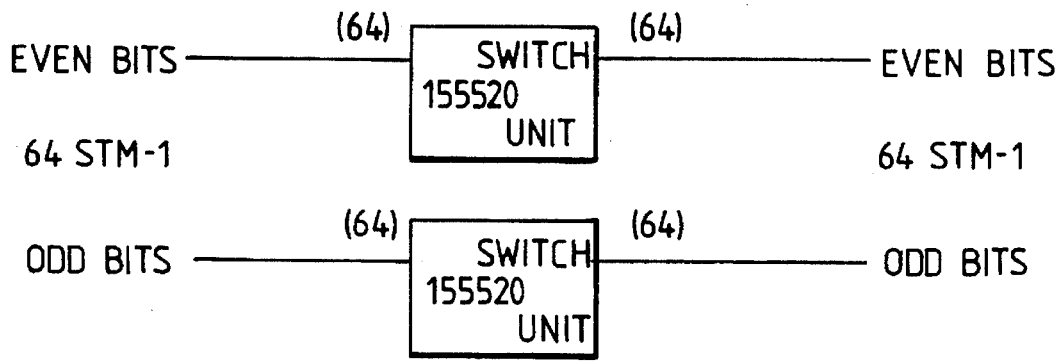
Figure 4C:
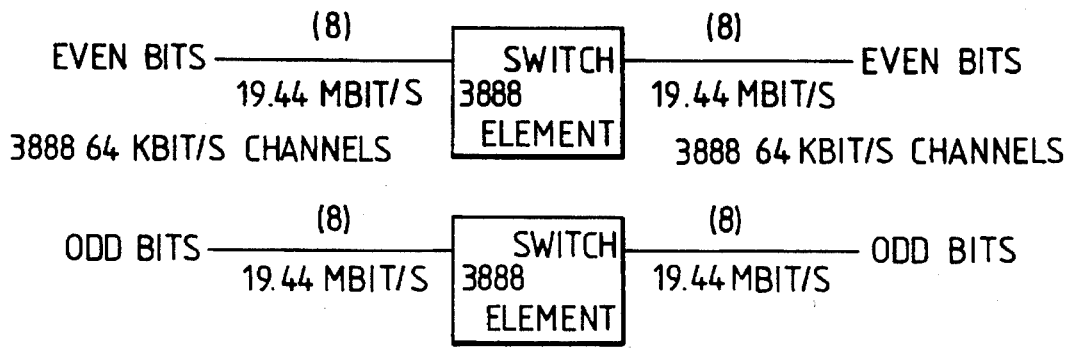
Figure 4:
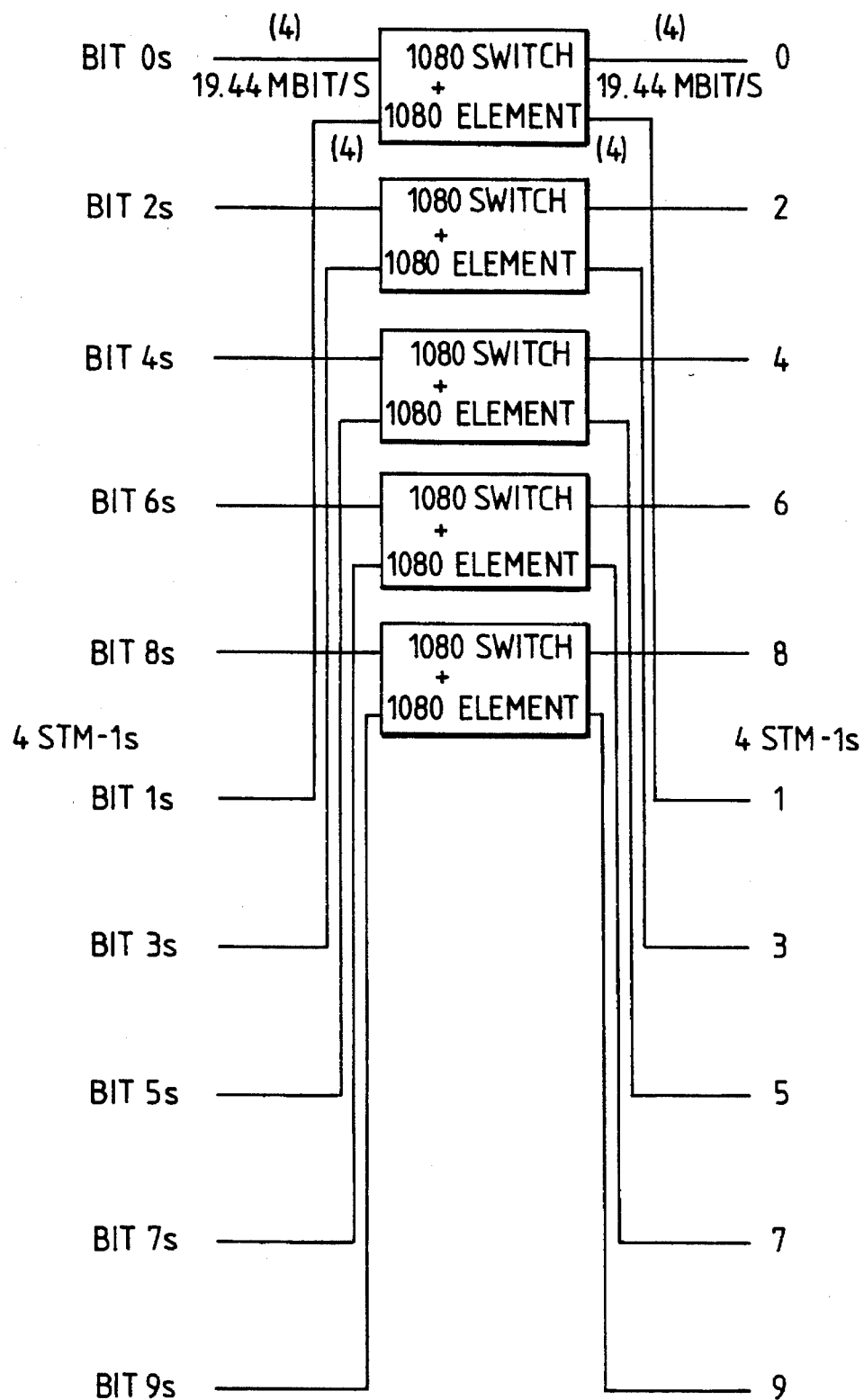

FIG. 1(d) corresponds to FIG. 2(a) and corresponds to FIG. 4(c).

Figure 1E:
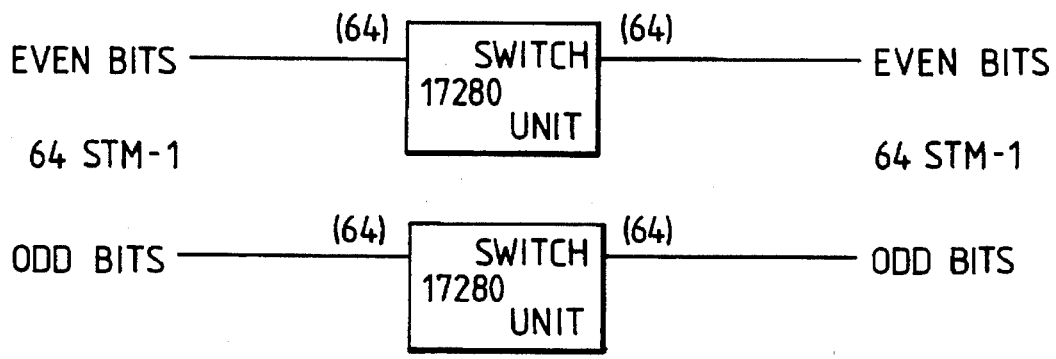
Figure 2D:
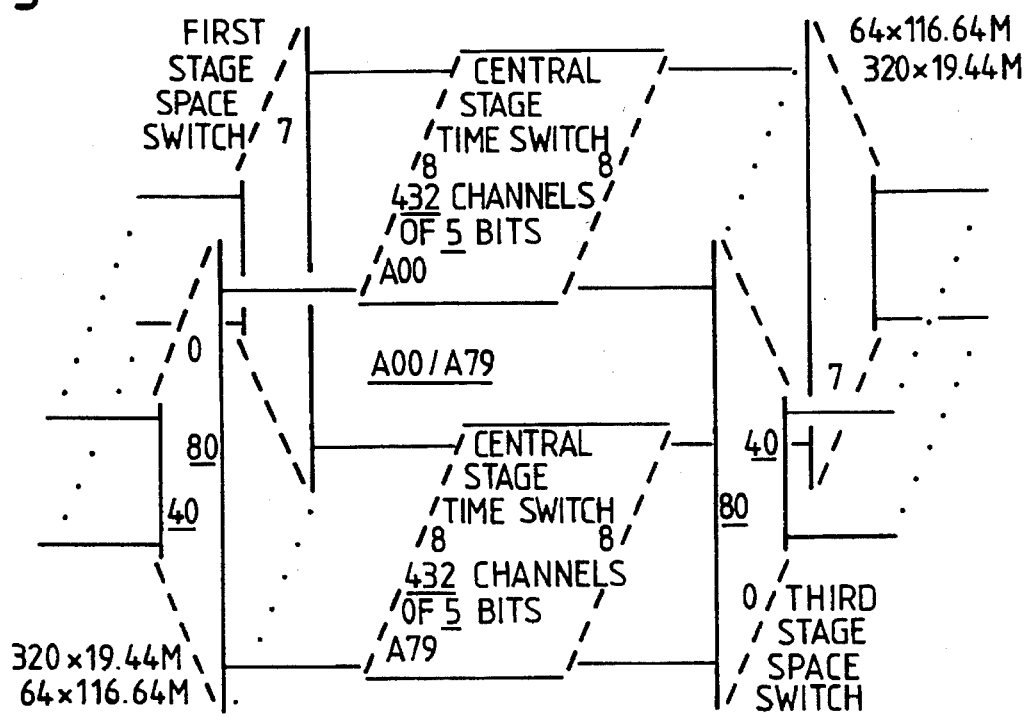

FIG. 1(e) corresponds to FIG. 2(d).

Figure 1F:
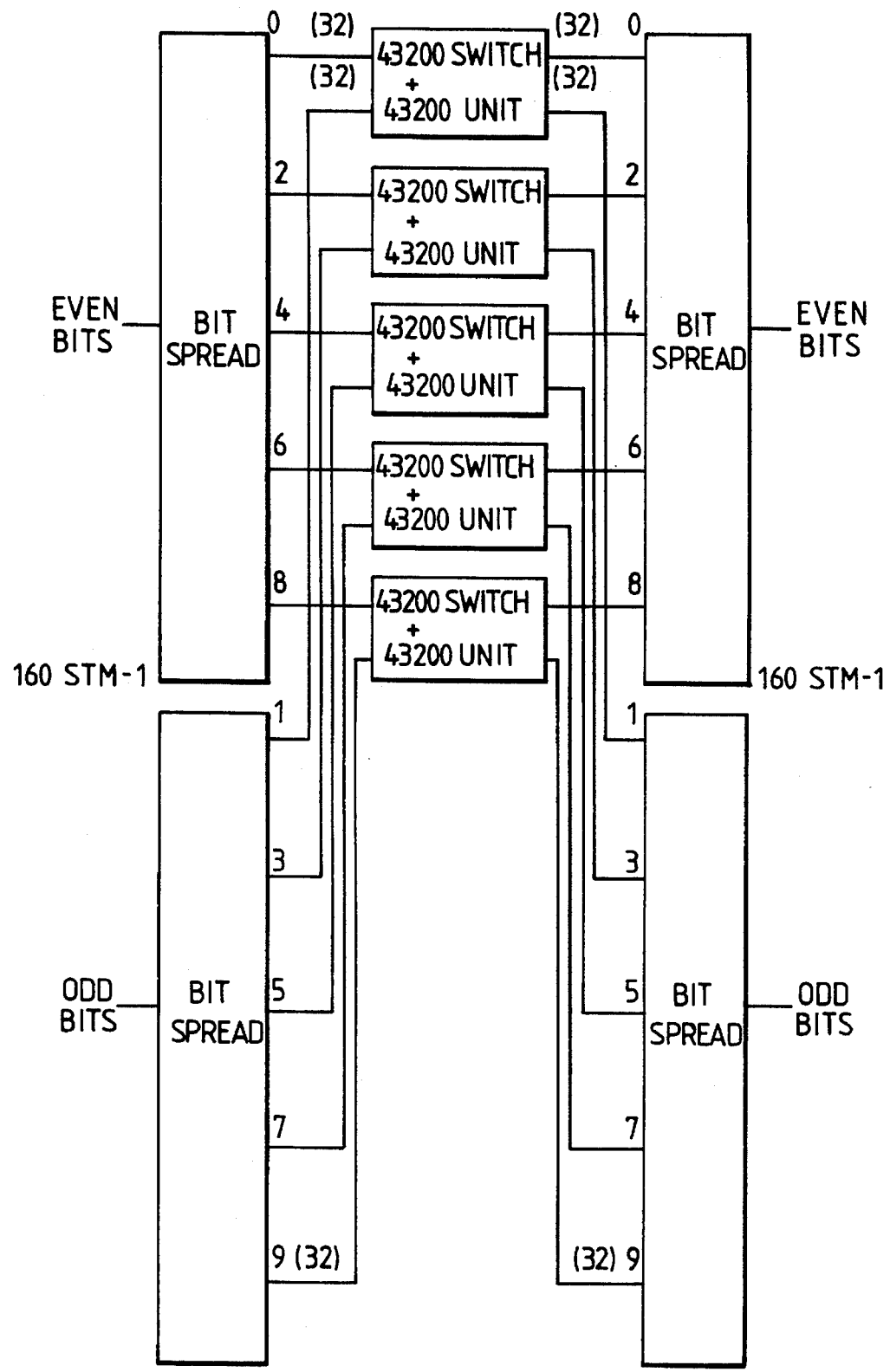
Figure 2E:
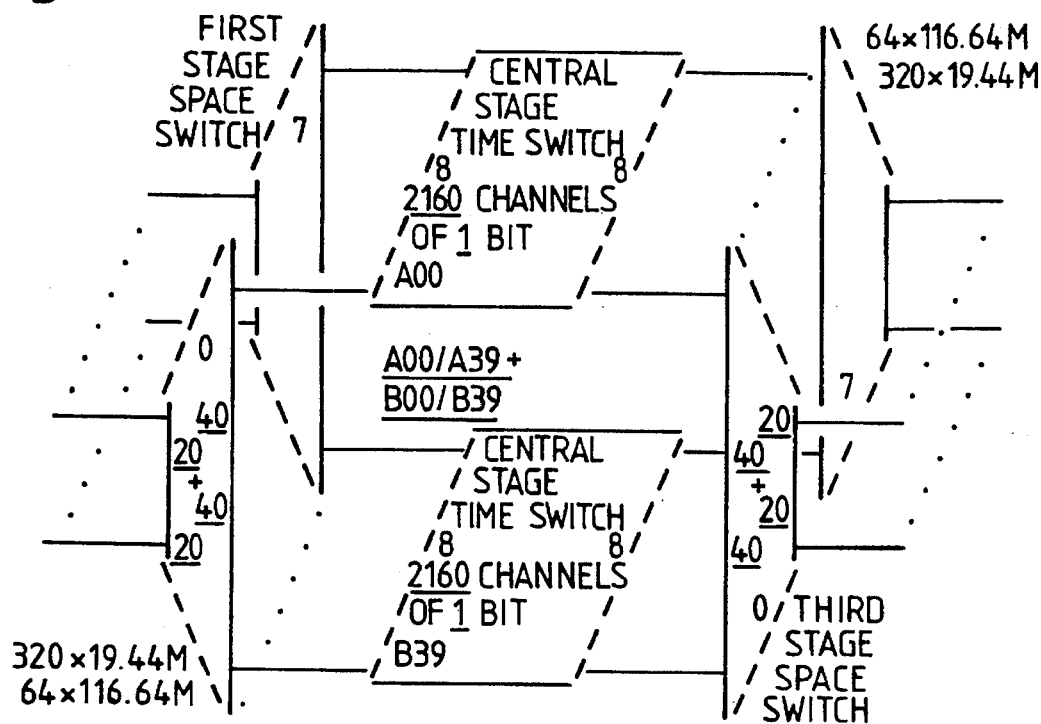

FIG. 1(f) corresponds to FIG. 2(e) and corresponds to FIG. 4(d).

Figure 2F:
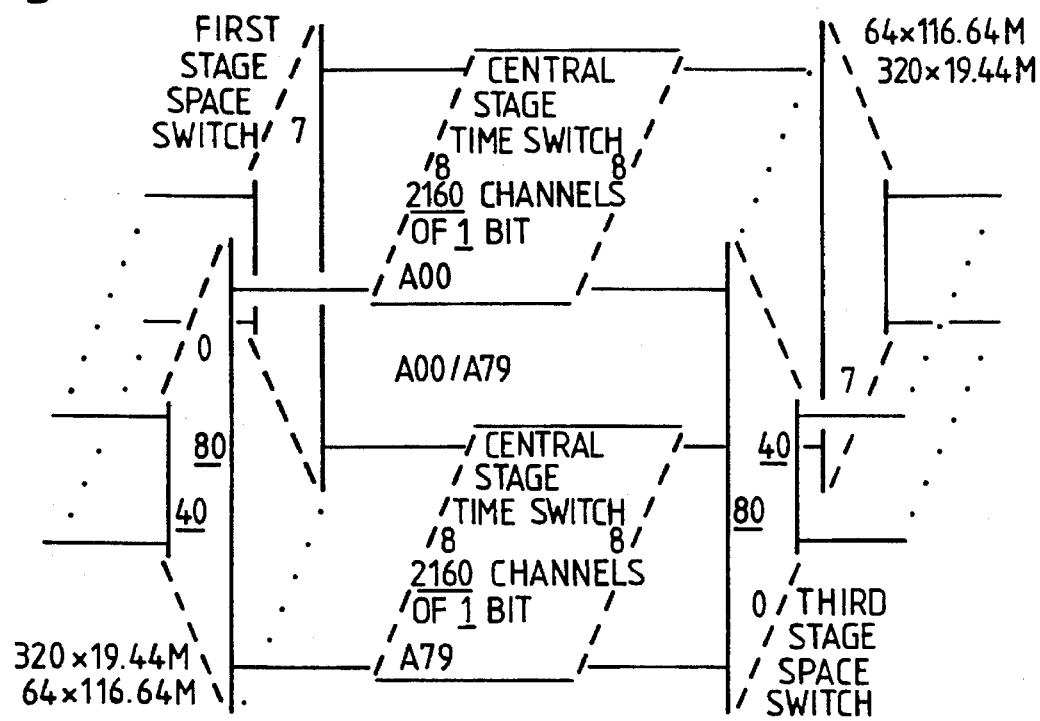
Figure 4E:
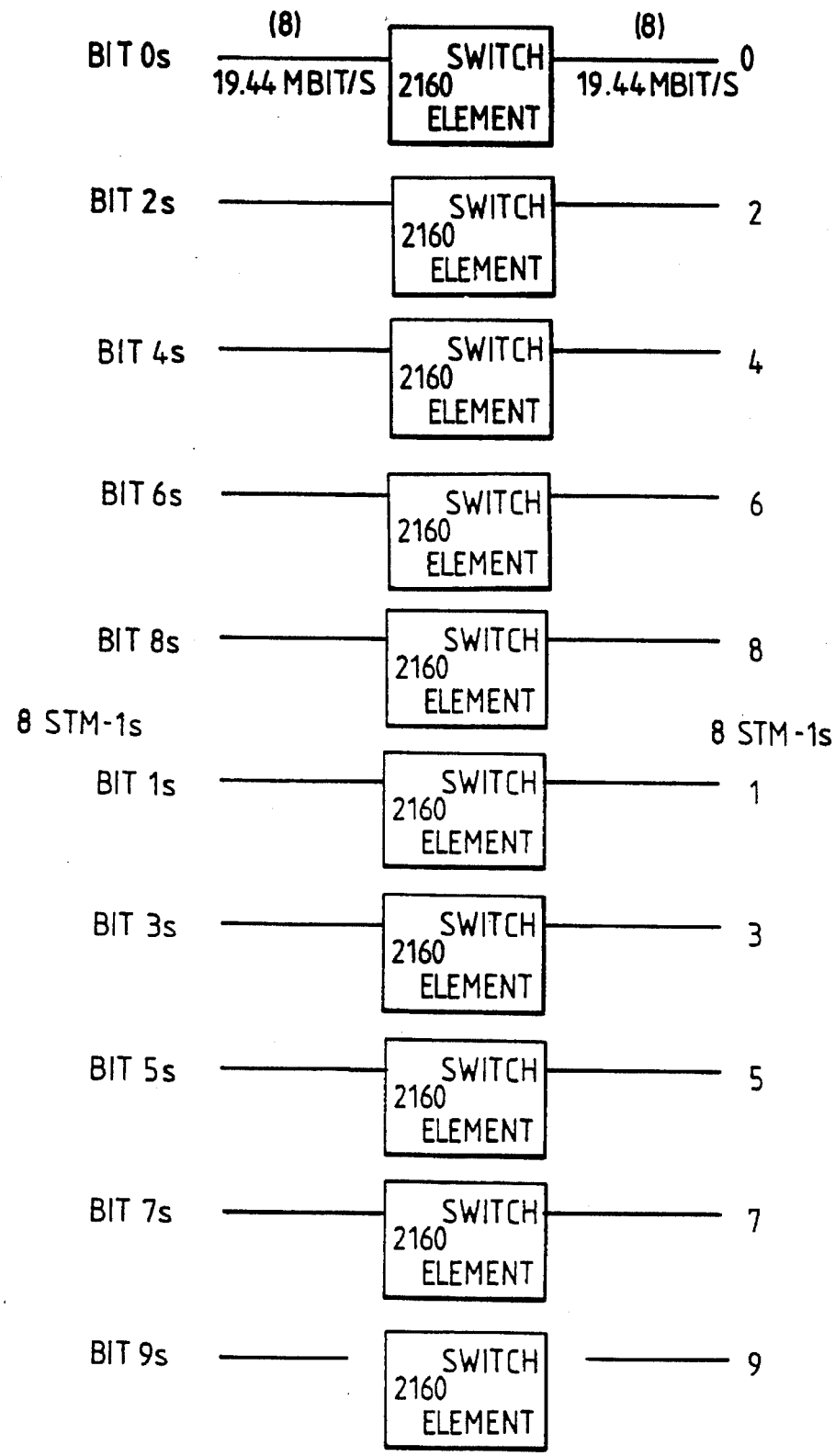

FIG. 1(g) corresponds to FIG. 2(f) and corresponds to FIG. 4(e).

Bit spreading occurs on these small VC switches as byte wide data is naturally bit spread.

It should be noted that, the arrangement in FIG. 4(e) contains exactly the same switching function i.e. 10 time switching elements, as the Central Time Switching card shown in FIG. 3.

Although a switching element is a functional part of the switching architecture, there is no necessity that a switching element is a single integrated circuit.

The architecture is such that the switching elements can be built from Application Specific Integrated Circuits (ASICs) which are of a reasonable size, without large numbers of outputs, without high speed I/Os, without large packages, and without high power dissipation.

All the input and output data rates of the switching elements are 19.44 Mbit/s. This is also true for the ASICs used to implement the elements.

Figure 5A:
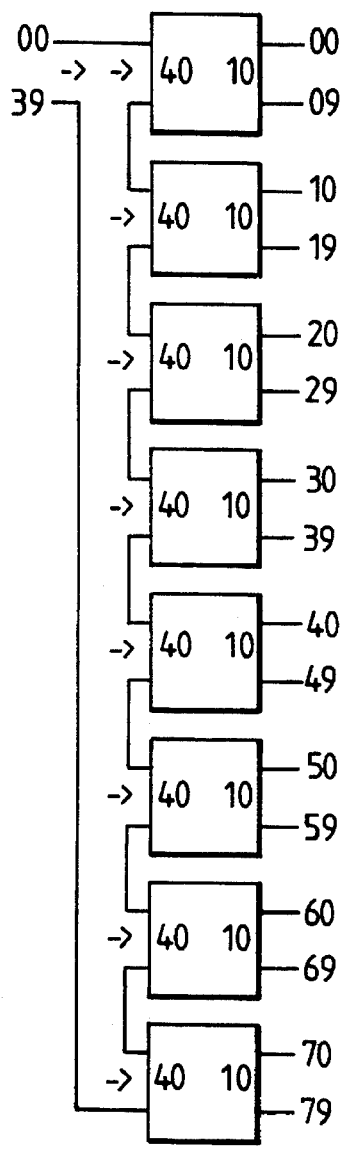
FIGS. 5(a)–5(c) show examples of switching elements.
Figure 5B:
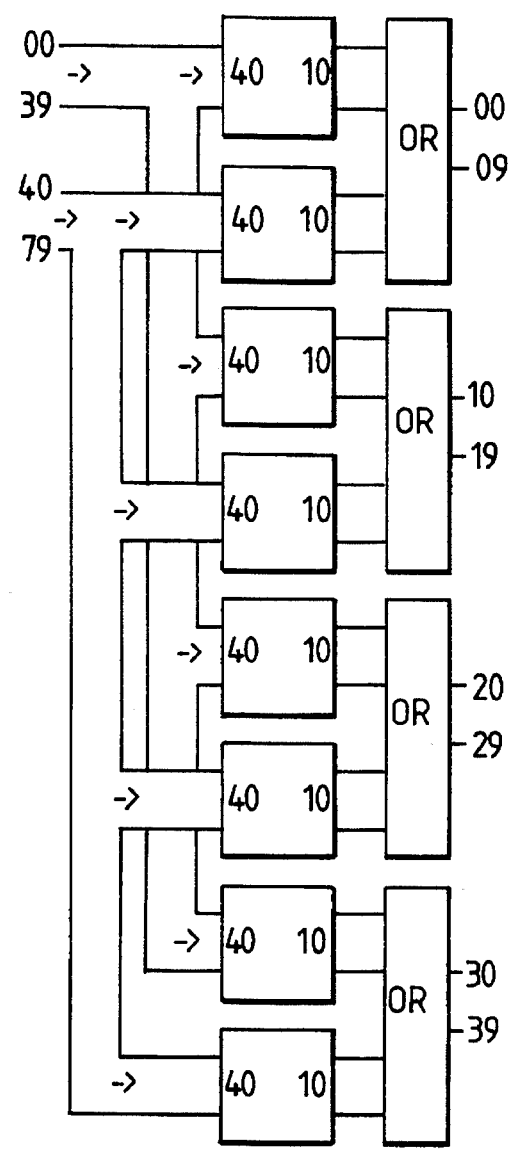

The time-multiplexed space switch ASIC has 40 input switching inputs and 10 outputs. 8 such ASICs can be configured as a 40×80 space switch element as shown in FIG. 5(a). 8 such ASICs can also be configured as an 80×40 space switch element, as shown in FIG. 5(b).

Figure 5C:
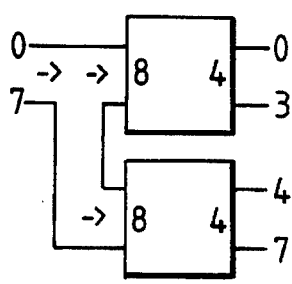

The time switch ASIC has 8 switching inputs and 4 switching outputs. 2 of these ASICs are required to make an 8×8 time switching element, as shown in FIG. 5(c).

Both the Space Switch ASIC and the Time Switch have to be able to work with 486, 54 or 270 channels per output. Therefore the control stores need to each have a maximum capacity of 486 locations.

In a 40×10 Time Multiplexed Space Switching ASIC for each output, the Space Switching ASIC has a 40 to 1 multiplexer and a Control Store. There is)also a single serial control interface function.

There are 10 Multiplexors and 10 Control Store RAMs.

Each Location of the control store contains 6 bits. 6 bits is sufficient to define which of the 40 inputs is required with some spare values to define what to output when no input is selected. This is essential for idle and diagnostic patterns.

As already explained the control store needs 486 locations. Therefore the total control store RAM of the 40×10 Space Switching ASIC requires 29160 bits.

In an 8×4 Time Switching ASIC, the ASIC contains; Control Store RAMs, Serial In/Parallel Out Registers, a Barrel Shifter, Speech (traffic) Store RAMs and one serial control interface function.

Figure 6A:
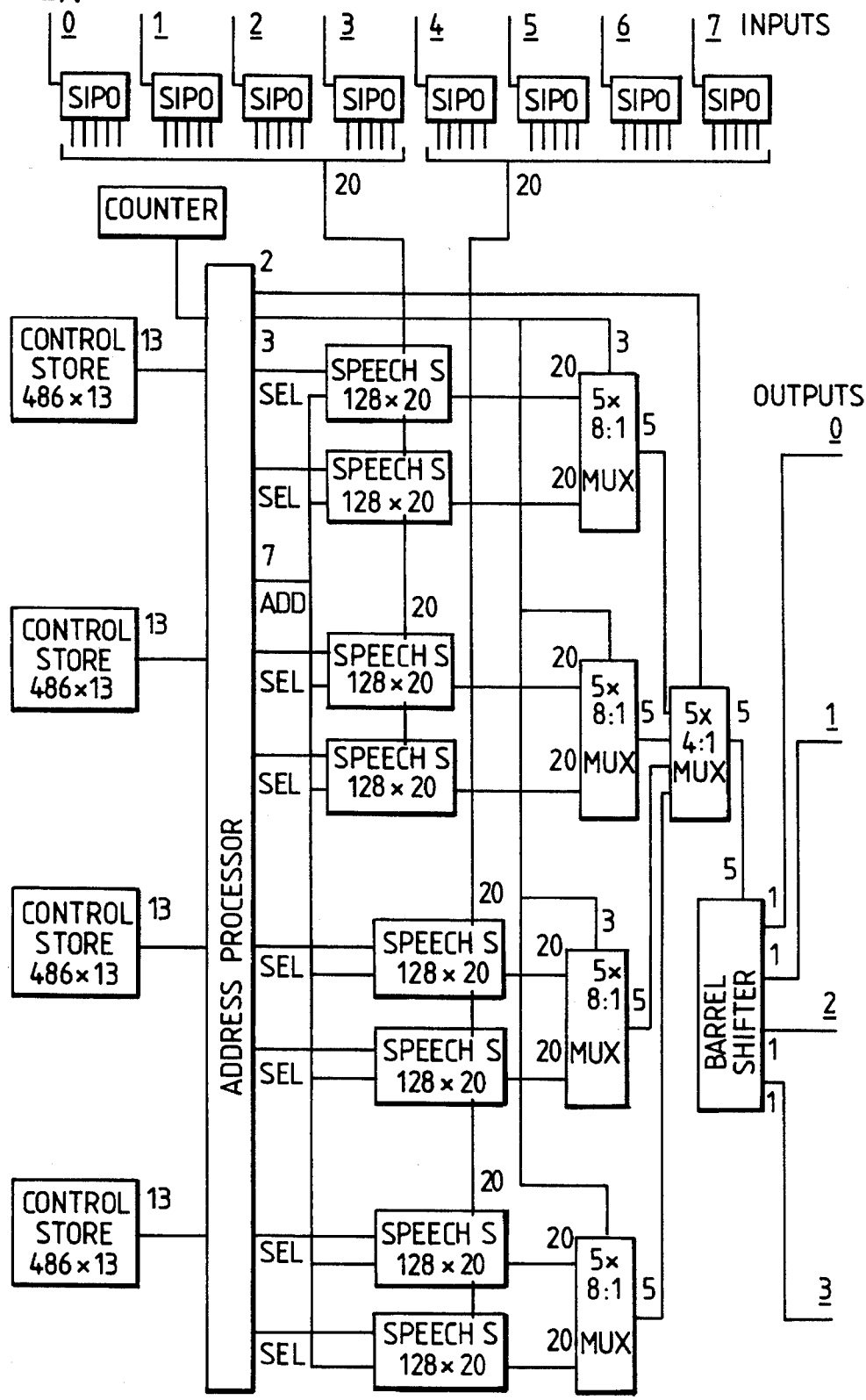
FIGS. 6(a) and 6(b) show examples of time switch ASICs.
Figure 6B:
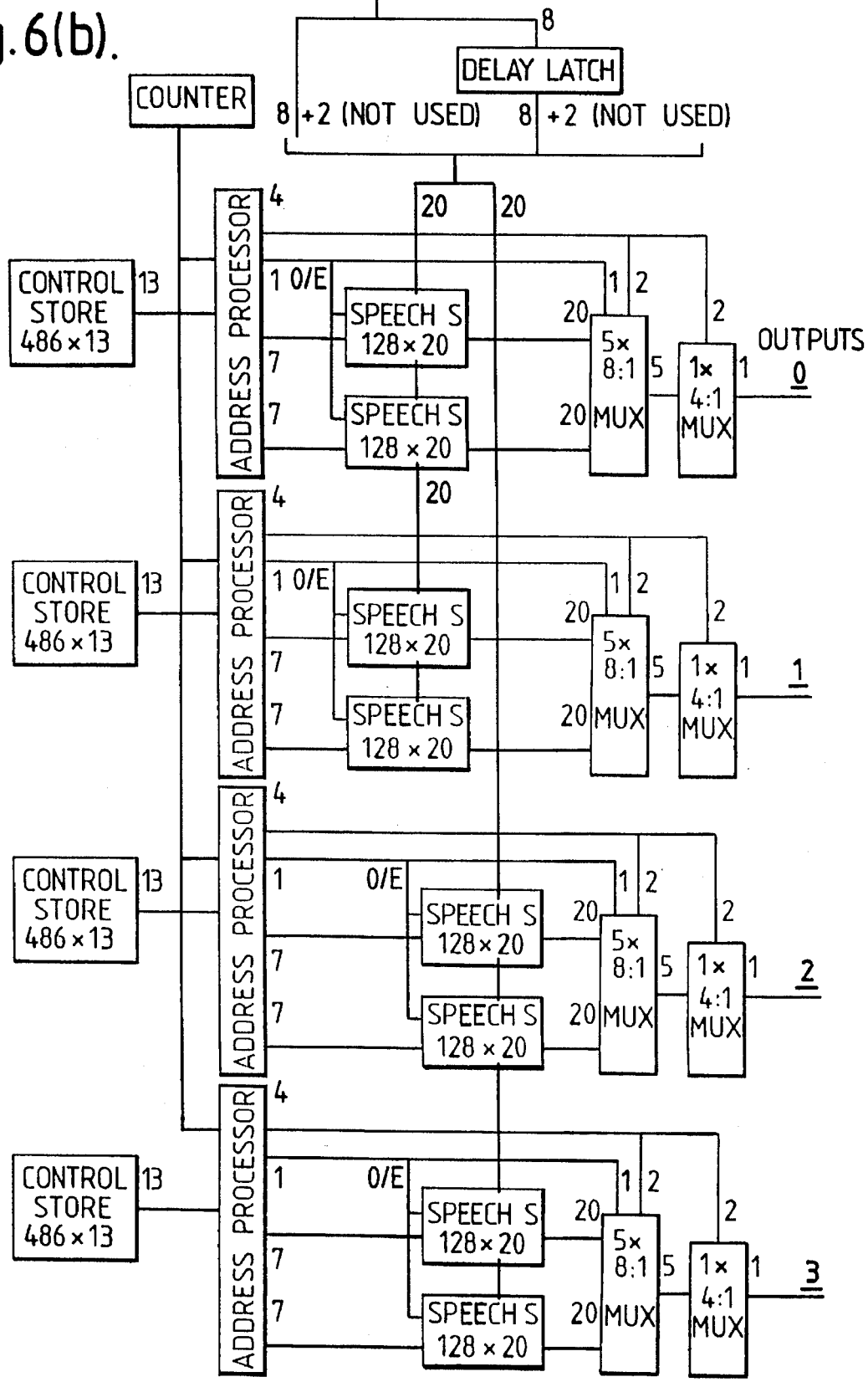

The ASICs shown in FIGS. 6(a) and 6(b) illustrate possible implementations of the Time function in a time-space-time switch as shown in FIGS. 1(a) to 1(g).

FIG. 6(a) shows the general arrangement of the switching ASIC for 5 bit switching and FIG. 6(b) for 1 bit switching.

A control store is also needed for each output of the Time Switching ASIC and each needs 486 locations. Because there are a maximum of 3888 channels entering the ASIC, at least 12 bits are needed to select an input channel. 13 bits are provided to supply enough spare values to define what to output when no input is selected. The 4 control store RAMs therefore need to each be 486×13, giving a total of 25272 bits.

When the 8 inputs to the ASIC are in 5 bit serial format, 8 Serial In/Parallel Out Registers are required to convert each input to 5 bit parallel format. A 5 to 4 Barrel Shifter is required to give the 4 serial outputs.

Column sequence, byte sequence and bit sequence integrity must be maintained. In order to avoid Double (or Swing) buffering, which increases the delay and memory requirements, the control store does not contain an absolute address of a speech store location. When a speech store access is to be made, the control store is still read. However, it indicates how many memory write cycles have occurred since the require input data was written into the speech store. As the last location written to the speech store is known, the required speech store address can be computed.

Using this technique, as described in our copending Application No. GB 9105922.0, published as GB 2,254, 754A the depth of the speech store only needs to correspond to the maximum duration for which any data needs to reside in the speech store.

For 64 kbit/s switching the 486 channels per frame has been increased to a maximum memory occupation of 512 write cycles. For VC switching where switching any column to any column is not required, although the maximum memory occupation could be reduced to less than 200 columns, it is convenient to use a value of 256.

In a Speech Stone Configuration 5 bit mode, the Speech Store memory requirement, when considering the 64 kbit/s switching needs, has to be able to handle 4096 channels of 5 bits. 4096 channels is 512×8, as opposed to 486×8 which is 3888.

With 5 bit serial interfaces, 5 clock cycles are available to perform the 8 writes and 4 reads that are necessary for an 8×4 Time switch. The Memory therefore has to be organised so that the 8 writes can be performed in parallel during one clock cycle, leaving the other 4 clocks for the 4 random read accesses. This could be 8 RAM blocks of 512×5, or one block of 512×40. The actual arrangement chosen is 8 RAM blocks of 128 by 20, with a 32:1 selector implemented in two major Stages. The multiplexors used also contain further circuitry for injecting idle and test patterns under direction from the control store, anthough the connections for these are not shown in the Figures.

In a Speech Store Configuration i bit mode, for the bit switching mode, in order to hold a complete copy of all the 256 input channels from 8 inputs, 2048 bits are required. Unfortunately for a 256×8 RAM, as all the clock cycles would be used for writes, no reads would be possible with single port RAM.

By writing two successive 8 bit input groups into a RAM (128×15) at the same time, then some 50% of the clock cycles are free for read accesses. Two such RAMs used alternately provide for a single output switch.

For 4 outputs 4 times the RAM is needed, namely, 8 RAM blocks of 128×16. Of course 128×20 blocks can be used instead.

Therefore 8 blocks of 128×20 bits can be used for the single bit switching mode over one 13.9 μs row, as well as for the 5 bit switching mode over a 125 μs frame.

Not only are the speech stores built from the same RAMs, but the control stores are also common as are the counters and some of the output multiplexors. Normally changing granularity of a switch has dramatic effect on the quantity of memory used. Using a combination of techniques, limiting the total number of channels, changing the length of the switching frame and using a bit spread architecture for the larger switches enables the same switching ASICs to efficiently meet two very different sets of requirements.

The table shown in FIG. 7 lists possible growth states. It also defines the minimum granularity that can be handled by each growth state and indicates the quantity of switching hardware per security plane.

In order to explain the theory, a switching format is assumed which has 9 bits in a byte and 9 rows in frame.

The example is for a single stage time switch.

```
Switch Format 1      Full length switching frame
                     One byte switched per channel per frame
                     One switching element per switching
                     function
                             Each switching element switches
                             all nine bits of each byte
                             Each switching element has :-
                                 I inputs
                                 C channels per input
                                 9 bits per channel
                     Total switch capacity:-
                             I × C channels of 9 bits per frame
                     Maximum switching delay is 1 frame
Switch Format 2 (Bit Spread)
                     Ninth length switching frame
                             i.e. one row
                     Nine bytes switched per channel per frame
                             i.e. One byte switched per channel per
                             row
                     Nine switching elements per switching
                     function
                             Each switching element switches one bit
                             of each byte
                             Each switching element has:-
                                 I inputs
                                 C channels per input
                                 1 per bit channel
                     Total switch capacity;-
                             I × C channels of 81 bits per frame
                     Maximum switching delay is one ninth frame
                     (1 row)
```

Switch Format 2 carries 9 times the bandwidth of Switch Format 1.

Comparing switching elements.

The number of inputs is the same (I) (Also equal to the number of inputs).

The number of input channels is the same (C) (Also equal to the number of output channels).

The data rate per input is the same (C×9 bits per Frame).

The size of the control store is the same:

```
Locations, one per output channel, (I × C)
Bits per location is n
    (where 2 to the power n is greater than I × C)
```

The size of the speech/traffic store control:

```
Minimum number of Locations;
    one per input channel (I × C)
Bits per location;
```

| | |
|---|---|
| Switch Format 1 | 9 bits |
| Switch Format 2 | 1 bit |
| Read Access Rate; | |
| Switch Format 1 | every 9 bits |
| Switch Format 2 | every bit |

In the case where the access rate is a critical feature of switching element design, and it normally is when building large circuit switches, then multiple copies of the speech/traffic stores have to be provided for Switch Format 2 type functions.

9 copies of the speech/traffic store are needed for Switch Format 2.

Therefore the Total Memory Requirement for the Speech/traffic store is;

| | |
|---|---|
| Switch Format 1 | I × C × 9 bits |
| Switch Format 2 | I × C × 9 bits |

The organisation of the memory is different for Switch Formats 1 and 2 but provided it is constructed of several suitable blocks it can be used for either Switch function. When the number of Inputs (I) also equals 9 then it becomes quite straight forward with the addition of suitable multiplexors.

This example which uses a factor of 9 shows that;

A Re-configurable Timing switching element can be used;

(i) Single to make a switch, or (ii) By using nine such elements to produce a switch carrying the same number of channels each of 9 times the bandwidth and with a ninth of the switching delay.

The principle applies for any value not just 9.

It applies for space switching elements not just time switches.

It applies for arrays of switches, e.g. SSS STS TST TTT.

It can be also partially applied e.g. 5 bits/1 bit: 5 times size switch: yet 9 to 1 row to frame relationship with some memory inefficiency.

I claim:

1. A telecommunications switch having a plurality of inputs and outputs, comprising: a plurality of switching units connected together in parallel to form switched connections between the inputs and the outputs and having an increased total bandwidth, each switching unit containing a multistage switching structure including both a plurality of time switching elements find a plurality of space switching elements arranged in a space-time-space arrangement, each time switching element having a switching granularity, each space switching element also having a switching granularity, both switching granularities being internally reconfigurable, whereby the telecommunications switch has an overall granularity which combines the granularities of the time switching elements and the space switching elements, said space Switching elements having first speech stores having outputs, and first control stores for addressing multiplexers connected for selecting the outputs from the first speech stores, said time switching elements having second speech stores, and second control stores for addressing the second speech stores, and said second speech stores forming reconfigurable memory blocks that are reconfigured.

* * * * *